(No Model.)
J. HOWARD.
CAR BRAKE ADJUSTER.
No. 515,079.
2 Sheets—Sheet 1.
Patented Feb. 20, 1894.
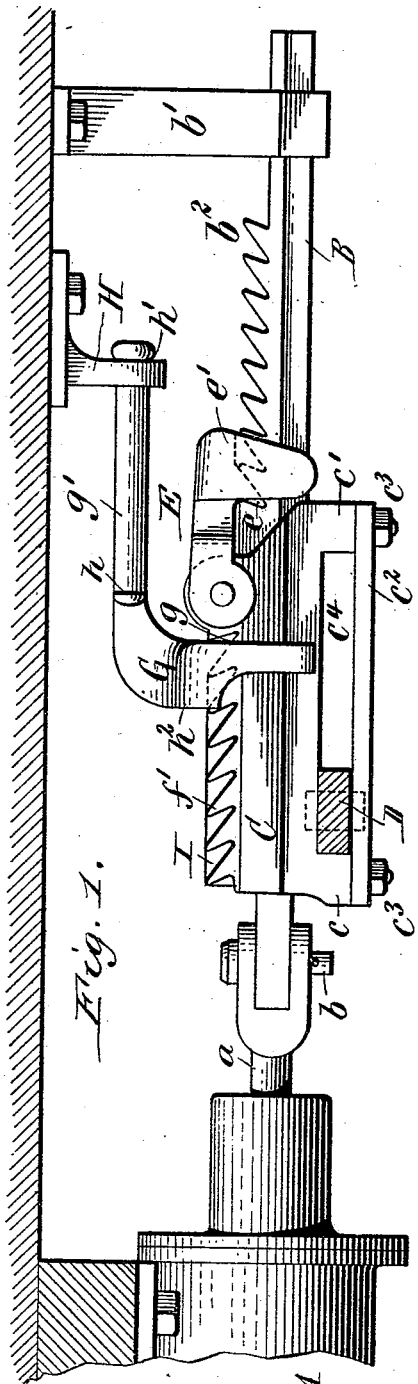
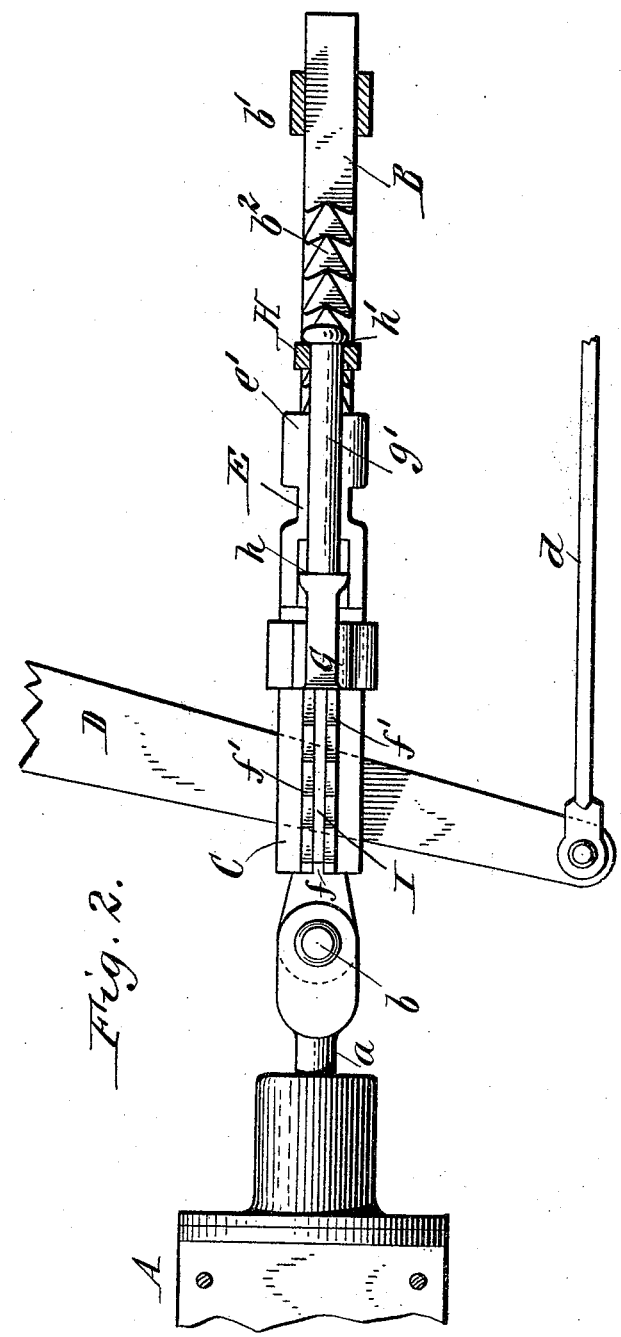
Witnesses:
Theo. L. Popp
Chas. F. Burkhardt
James Howard Inventor.
By Wilhelm Bonner
Attorneys (No Model.) 2 Sheets—Sheet 2.
J. HOWARD.
CAR BRAKE ADJUSTER.
No. 515,079. Patented Feb. 20, 1894.
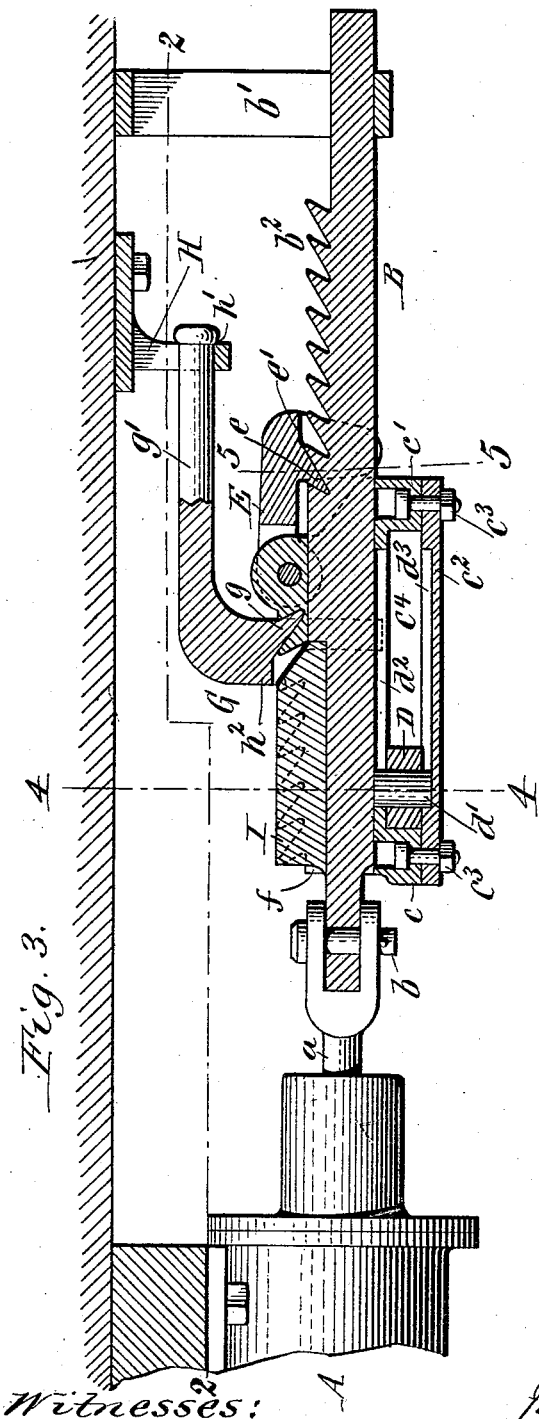
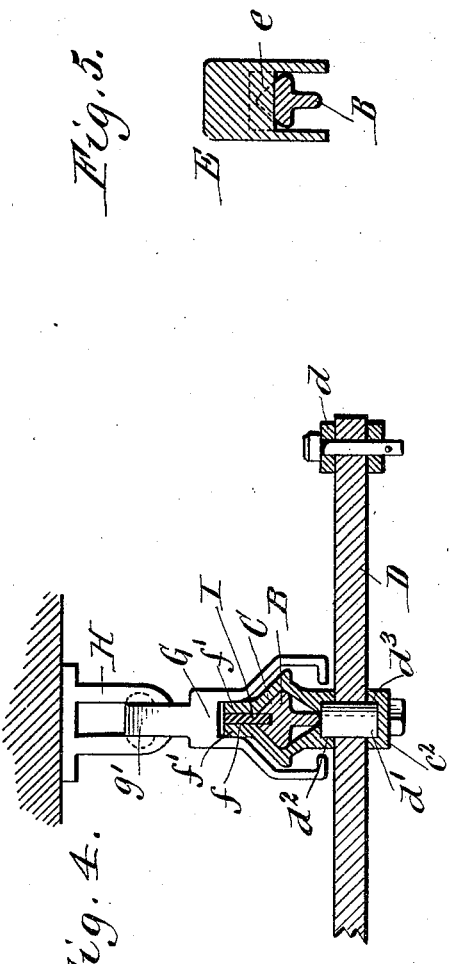

UNITED STATES PATENT OFFICE.

JAMES HOWARD, OF NEW YORK, N. Y.

CAR-BRAKE ADJUSTER.

SPECIFICATION forming part of Letters Patent No. 515,079, dated February 20, 1894.

Application filed December 6, 1893. Serial No. 492,944. (No model.)

*To all whom it may concern:*

Be it known that I, JAMES HOWARD, a citizen of the United States, residing at New York, in the county of New York and State of New York, have invented new and useful Improvements in Automatic Brake-Adjusters, of which the following is a specification.

This invention relates to that class of air brakes for railway cars which are provided with means for automatically taking up the slack in the brake gearing.

The object of my invention is to provide means whereby the take up mechanism is prevented from taking up all the slack during one application of the brake, when, in case of emergency an extra pressure is applied to the brakes; also to improve the construction of the pawls so as to prevent snow, ice or grit from obstructing the teeth of the ratchet bar and block, and to connect the brake lever with the hand and power mechanism in such manner that the brake can be operated by hand without affecting the power mechanism.

In the accompanying drawings consisting of two sheets:—Figure 1 is a side elevation of my improved brake gearing. Fig. 2 is a top plan view thereof, partly in section, the plane of section being in line 2—2, Fig. 3. Fig. 3 is a vertical longitudinal section thereof. Figs. 4 and 5 are vertical transverse sections in lines 4—4 and 5—5, Fig. 3, respectively.

Like letters of reference, refer to like parts in the several figures.

A represents the brake cylinder secured in a horizontal position underneath the car and provided with a piston having a rod $a$ which passes through one end of the cylinder.

B represents the horizontal ratchet bar secured at its front end to the piston rod by a pin $b$ and supported at its rear end in a loop $b'$ attached to the under side of the car. The upper side of the ratchet bar is provided near its rear end with a row of ratchet teeth $b^2$ having inclined front sides and abrupt rear sides.

C represents the ratchet block which surrounds the ratchet bar and slides lengthwise thereon. This block is provided on its under side, at opposite ends, with depending lugs $c\ c'$.

$c^2$ represents a longitudinal bar secured at its ends to the depending lug $c\ c'$, by bolts $c^3$, and forming with the lugs $c\ c'$ and the under side of the ratchet block a longitudinal slot $c^4$.

D represents the main brake lever which is arranged with its actuated end in the slot $c^4$ of the ratchet block, and which is connected at one end with the hand pull rod $d$ and at its other end with the brake shoes by any usual or suitable intermediate mechanism. When the ratchet block is moved lengthwise, one or the other of its depending lugs strikes the brake lever and compels the same to move with it, but when the block is at rest the brake lever is capable of moving independently of the block, to the extent of the slot $c^4$ in the latter. The brake lever is held against lengthwise displacement in the ratchet block by a vertical pin $d'$, arranged in the brake lever and engaging with its ends in longitudinal grooves or ways $d^2\ d^3$ formed respectively in the under side of the ratchet block and the upper side of the longitudinal bar $c^2$. By this loose connection between the ratchet block and brake lever, the latter can be operated by hand without disturbing the power mechanism.

E represents the connecting pawl whereby the ratchet block is connected with or held in position on the ratchet bar. This pawl is pivoted with its front end upon the rear end of the ratchet block and is provided at its rear end with a hook $e$ which engages with the teeth of the ratchet bar. The hook of the connecting pawl engages successively with the teeth of the ratchet bar, when slack in the brake gearing is taken up. During winter, snow and ice may accumulate upon the ratchet bar, and fill up the space between the teeth, so that the connecting pawl cannot engage with the teeth. In order to permit this pawl to engage with the tooth of the ratchet bar next in advance of the pawl, the latter is provided with a shield or hood $e'$ which projects forwardly and covers the space between the teeth of the ratchet bar immediately in advance of that tooth with which the pawl is engaged, thereby preventing any snow or ice from entering said space. If desired the shield may be extended to cover a greater number of the teeth of the ratchet bar, but this is not ordinarily necessary, because the wear upon the brake shoes is usually not sufficient to cause more than one tooth to be taken up before the car is inspected and the accumulations are removed from the ratchet bar. The upper side of the ratchet block is provided with a longitudinal slot $f$ extending rearwardly from its front end and with two rows of teeth $f'$ arranged on opposite sides of the slot and having abrupt front sides and inclined rear sides.

G represents the detent pawl, whereby the slack in the brake gearing, due to wear of the brake shoes and connecting parts is taken up. This pawl is provided at its depending front end with a hook $g$ which engages with one of the teeth of the ratchet block and at its upper rear portion with a stem or shank $g'$. This stem slides lengthwise of the car, in a hanger H, secured to the under side of the car and is provided with shoulders or stops $h\ h'$, in front and in rear of the hanger, which are adapted to strike against the hanger for limiting the movement of the detent pawl. The detent pawl is provided with a forwardly projecting hood or shield $h^2$ similar to that of the connecting pawl, which covers the space between the teeth in front of the detent pawl and prevents snow and ice from lodging in the same, thereby insuring engagement of the detent pawl with the next advancing tooth, for taking up slack.

I represents a guard whereby the detent pawl is prevented from taking up more than one tooth of the ratchet block during each application and release of the brake. This guard consists of a longitudinal bar or rib secured to or formed on the upper side of the ratchet bar and projecting upwardly through the slot of the ratchet block and between its ratchet teeth. The upper side of the guard is flush with the top of the teeth of the ratchet block and its rear end is inclined to correspond to the angle of the inclined sides of said teeth. During the forward movement of the piston of the brake cylinder, the front lug $c$ of the ratchet block bears against the brake lever and carries the same forwardly with the piston, thereby applying the brake shoes to the car wheels. During the backward movement of the piston, the brake lever is returned to its former position by the brake shoes falling away from the car wheels.

When the brake shoes are in their normal or ordinary condition, the connecting pawl remains in engagement with one of the teeth of the ratchet bar, the hook of the detent pawl remains in engagement with one of the teeth of the sliding block and the stem of the detent pawl slides without restraint in its hanger, neither of its stops striking against the hanger. When a certain amount of slack has been produced in the brake gearing, from wear of the brake shoes or any other cause, the front stop of the stem strikes the hanger during the last portion of the forward movement of the piston, whereby the sliding movement of the detent pawl is arrested, while the ratchet block continues to advance with the piston, causing the detent pawl to ride over and engage with the next tooth of the ratchet block. During the backward movement of the piston, the ratchet bar and the detent pawl are carried along with the piston until the rear stop of the detent pawl strikes the hanger, when the backward movement of the detent pawl and of the ratchet block connected therewith is arrested, while during the remaining portion of the backward stroke of the piston, the connecting pawl is caused to ride over the next tooth in advance of it, thus taking up the slack in the brake gearing, in a well known manner. The rear end of the guard on the ratchet bar is always in line with the inclined side of the second tooth in front of the one with which the detent pawl engages, and its upper side bridges the spaces between the remaining teeth in front of the detent pawl, thereby preventing the detent pawl from taking up more than the first tooth of the ratchet block in front of the detent pawl during one application and release of the brakes. When the detent pawl engages with a new tooth and shifts the ratchet bar, the guard is also shifted owing to its connection with the ratchet bar, bringing its inclined rear side in line with the next forward tooth.

Ordinarily the brake shoes are applied with such a pressure that they bear firmly against the car wheels, and the movement of the piston during such an application is only sufficient to take up a single tooth at a time when the brake shoes become worn. When an extra pressure is applied to the brakes, as for instance, in an emergency, the brake shoes are caused to bear against the car wheels with such force that the brake beams are deflected and the trucks are tilted or moved out of their normal position, drawing taut all the parts connected with the brake gearing and allowing the piston to move forward an abnormal distance; such abnormal stroke being equivalent to the taking up of an extra amount of slack, although not caused by the wearing of the brake shoes. In the absence of the guard before described, the detent pawl rides over a sufficient number of teeth on the ratchet block to take up all of this abnormal slack, upon the forward stroke of the piston, which is undesirable, because, when the trucks and brake beams assume their normal position the brake shoes cannot recede sufficiently to clear the wheels, but remain in contact therewith, even when the piston of the brake cylinder reaches the limit of its backward stroke.

Although the detent of my brake mechanism, under the above mentioned condition, rides over an excessive number of teeth of the brake block during the forward movement of the piston, it is prevented by the guard I from engaging with any of such surplus teeth during the backward stroke of the piston and allowed to engage only between the two rearmost teeth of the ratchet block not bridged by the guard, thus avoiding the taking up of all such slack and permitting the brake shoes to recede out of contact with the wheels.

I claim as my invention—

1. The combination with the ratchet bar, of a ratchet block connected with the ratchet bar, a brake lever capable of a limited movement on the ratchet block, lengthwise of the car, and a hand pull rod connected with said brake lever, substantially as set forth.

2. The combination with the ratchet bar, of a ratchet block connected with the ratchet bar and provided with a longitudinal slot, a brake lever arranged with its actuated end in said slot and capable of a limited movement therein independent of the ratchet block, and a hand pull rod connected with said brake lever, substantially as set forth.

3. The combination with the ratchet bar, of a ratchet block connected with the ratchet bar and provided with depending lugs, a bar secured with its ends to said lugs and forming with the ratchet block a longitudinal slot, a brake lever arranged with its actuated end in said slot and capable of a limited movement therein independent of said ratchet block, and a hand pull rod connected with said lever, substantially as set forth.

4. The combination with the ratchet bar, of a ratchet block connected with the ratchet bar and having a longitudinal slot, a brake lever arranged with its actuated end in said slot and capable of a limited forward and backward movement therein, and means for holding said lever from lengthwise displacement in the slot, substantially as set forth.

5. The combination with the ratchet bar, of a ratchet block connected with the ratchet bar and provided on its under side with a longitudinal groove and near the ends of said groove with depending lugs, a bar secured with its ends to said lugs and provided on its upper side with a longitudinal groove, a brake lever arranged with its actuated end between the ratchet block and the longitudinal bar, a pin passing through said lever and arranged with its ends in the grooves of the ratchet block and longitudinal bar, and a hand pull rod connected with said lever, substantially as set forth.

6. The combination with the ratchet bar, the ratchet block and the brake lever, of a pawl connecting the ratchet block with the ratchet bar and provided with a shield or hood which covers the space between the teeth of the ratchet bar in advance of the connecting pawl, substantially as set forth.

7. The combination with the ratchet bar, the ratchet block, the pawl connecting the ratchet block with the ratchet bar, and the brake lever connected with the ratchet block, of a detent pawl engaging with the teeth of the ratchet block and provided with a hood or shield which covers the space between the teeth of the ratchet block in advance of the detent pawl, substantially as set forth.

8. In a brake gearing, the combination with the ratchet bar, the ratchet block provided with a row of teeth, the pawl connecting the ratchet bar with the ratchet block, the detent pawl adapted to engage successively with the teeth of the ratchet block, and the brake lever, of a guard arranged adjacent to the teeth of the ratchet block and adapted to prevent the detent pawl from taking up an excessive number of teeth upon applying and releasing the brake, substantially as set forth.

9. In a brake gearing, the combination with the ratchet bar, the ratchet block provided with a row of teeth, the pawl connecting the ratchet bar with the ratchet block, the detent pawl adapted to engage successively with the teeth of the ratchet block, and the brake lever, of a guard secured to the ratchet bar and arranged to bridge the spaces between the teeth of the ratchet block, to prevent the detent pawl from taking up an excessive number of teeth upon applying and releasing the brake, substantially as set forth.

10. In a brake gearing, the combination with the ratchet bar, the ratchet block provided with a longitudinal slot and a row of teeth on opposite sides of said slot, the pawl connecting the ratchet bar with the ratchet block, the detent pawl adapted to engage successively with the teeth of the ratchet block and the brake lever, of a guard bar secured to the ratchet bar and extending upwardly through the slot in the ratchet block to the top of the teeth thereof, substantially as set forth.

Witness my hand this 2d day of December, 1893.

JAMES HOWARD.

Witnesses:
W. WILLARD BABCOCK,
IRVING E. MEAD.